(12) United States Patent
Russell

(10) Patent No.: US 6,517,440 B2
(45) Date of Patent: Feb. 11, 2003

(54) PLASTIC SHAFTS WITH MOLDED CORE AND EXTERNAL FEATURE

(75) Inventor: Robert D. Russell, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/293,098

(22) Filed: Apr. 16, 1999

(65) Prior Publication Data

US 2002/0165032 A1 Nov. 7, 2002

(51) Int. Cl.[7] ................................................. F16C 3/00
(52) U.S. Cl. ...................... 464/179; 464/183; 464/181; 264/274
(58) Field of Search ................................ 464/183, 181, 464/179; 264/274, 46.6

(56) References Cited

U.S. PATENT DOCUMENTS

| | | |
|---|---|---|
| 1,858,650 A | 5/1932 | Weida |
| 2,440,144 A | 4/1948 | Hosking |
| 2,869,339 A | 1/1959 | Drake |
| 3,479,704 A | 11/1969 | Reed |
| 3,553,978 A | 1/1971 | Williams |
| 3,632,263 A | 1/1972 | Blanchard |
| 3,659,434 A | 5/1972 | Wolfe |
| 3,707,113 A | 12/1972 | Hein et al. |
| 3,716,612 A | 2/1973 | Schrenk et al. |
| 3,968,561 A | 7/1976 | Oakes et al. |
| 4,038,359 A | 7/1977 | Pendleton |
| 4,063,429 A | 12/1977 | Wilson |
| 4,101,617 A | 7/1978 | Friedrich |
| 4,169,304 A | 10/1979 | Binder |
| 4,216,634 A | 8/1980 | Binder |
| 4,256,685 A | 3/1981 | Vassar |
| 4,372,668 A | 2/1983 | Malachowski et al. |
| 4,380,442 A | 4/1983 | Amsel |
| 4,474,717 A | 10/1984 | Hendry |
| 4,555,225 A | 11/1985 | Hendry |
| 4,600,548 A | 7/1986 | Nenna |
| 4,660,963 A | 4/1987 | Stemmle |
| 4,800,057 A * | 1/1989 | Rabe ........................ 264/135 |
| 4,988,472 A | 1/1991 | Orimoto et al. |
| 5,425,675 A * | 6/1995 | Pfeifer ........................ 464/28 |
| 5,439,416 A | 8/1995 | Jaskowiak |
| 5,533,247 A | 7/1996 | Ishii et al. |
| 5,538,475 A | 7/1996 | Jaskowiak |
| 5,683,641 A | 11/1997 | Jaskowiak |
| 5,744,238 A * | 4/1998 | Limperis et al. ........ 428/411.1 |
| 5,876,288 A | 3/1999 | Jaskowiak |
| 5,893,210 A * | 4/1999 | Takei et al. ............ 29/895.32 |
| 5,913,937 A | 6/1999 | Lin ........................... 74/411 |

FOREIGN PATENT DOCUMENTS

| | | |
|---|---|---|
| EP | 0 248 567 | 12/1987 |
| JP | 58-94619 | 6/1983 |
| JP | 63-54926 | 10/1988 |

* cited by examiner

Primary Examiner—Lynne H. Browne
Assistant Examiner—Aaron Dunwoody
(74) Attorney, Agent, or Firm—Andrew D. Ryan

(57) ABSTRACT

A shaft assembly including an elongated member having at least a portion which is hollow having an inside surface defining a shaft core is provided. The shaft assembly includes a rotatable, torque transmitting elongated member defining a portion thereof which is hollow having an inside surface and defining a shaft core. The shaft has an outside surface including a torque transmitting portion and a functional feature portion. The elongated member defines an aperture gate extending from the inside surface to the outside surface. The elongated member also defines a hardened, moldable material. The material extends from the inside surface through the aperture gate. The material is secured to at least a portion of the outside surface.

31 Claims, 15 Drawing Sheets

PLASTIC SHAFTS WITH MOLDED CORE AND EXTERNAL FEATURE

BACKGROUND OF THE INVENTION

The present invention relates to a shaft for use in a machine to perform at least one operation. In particular, it relates to a light weight, low cost, shaft assembly having a hollow, tubular, shell like portion containing a hardened, moldable material within its core in communication with at least one molded feature on the outside or at the end of the tubular shell like portion.

Cross reference is made to the following application filed concurrently herewith: U.S. application Ser. No. 09/293,346 entitled "Hollow Shafts with Gas Assist Molding" by Robert D. Russell.

While the present invention has utility in apparatus comprising various mechanical components, it has particular application and will henceforth be described with reference to electrostatographic reproducing apparatus. Briefly, and as illustrated in FIGS. 1 and 2, in electrostatographic printing apparatus commonly in use today a photoconductive insulating surface 10 which is typically the surface of a rotatably drum is charged to a uniform potential by a charge corotron 12 and thereafter exposed to a light image of an original document 15 to be reproduced on an exposure platen 16 by means of exposure lamp 17, the exposure discharging the photoconductive insulating surface in exposed or background areas creating an electrostatic latent image on the photoconductive insulating surface of the document. A developer unit 20 is which corresponds to the image areas contained within the apparatus and has developer material to developed the electrostatic latent image. Typically, the developer material has charged carrier particles and charged toner particles which triboelectrically adhere to the carrier particles and during development, the toner particles are attracted from the carrier particles to the charged areas of the photoconductive insulating surface. The developed image on the photoconductive insulating layer is subsequently transferred at a transfer station 24 to a support surface, such as copy paper which is fed by feeder 22 to provide intimate transfer contact between the insulating area and the copy paper. The toner image on the copy paper is subsequently, permanently affixed on the copy paper by the application of heat and/or pressure in a fuser 23. Subsequent to the transfer of the toner image to the support surface, any residual toner remaining on the photoconductor is cleaned by a cleaner 19 in preparation for the next imaging cycle. FIG. 2 illustrates the claim shell nature of this machine having a lower frame member 25 and an upper frame member 26 which has two shafts, 27, 28 in the copy sheet transport system. For example, the shafts 27 and 28 may be paper path nip shafts.

Alternatively, the electrostatic latent image may be generated from information electronically stored or generated in digital form which afterwards may be converted to alphanumeric images by image generation, electronics and optics. For further information on such apparatus, attention is directed to U.S. Pat. No. 4,372,668 to Malachowski et al., and U.S. Pat. No. 4,660,963 to Stemmle et al.

In these machines, shafts are typically used to provide a variety of features performing functions within the machines. For example, shafts typically have gears, rolls, pulleys or other drive mechanisms mounted thereon to enable driving various parts or systems in the machine. For example, the shafts may be paper path nip shafts. In addition, the shafts may have retention or location features such as, snaps, fitting elements or stops or may contain other features such as bearings, bushings, rollers, journals and O-rings. Initially, the shafts were typically made from solid materials such as, metals like, steel and aluminum, and the individual functional features or elements such as rollers or gears were individually mounted to the shaft and secured thereto. Typically, this assembly process was manually completed as it did not readily lend itself to automated assembly. While satisfactory in many respects, such shaft assemblies were both heavy and costly in that solid shafts contained more metal and therefore cost more. Each of the individual functional features has to be separately manufactured, separately assembled onto the shaft assembly, all of which increased both materials and assembly time and cost particularly when most of the functional features had to also be located and fixed by way of set screws or other such device to the shaft. Alternatively, the functional features have been formed on metal stock material by such conventional metal working techniques as turning, milling and grinding. In addition, the weight of such shaft assemblies provided a high moment of inertia which necessitated increased drive power requirements.

Referring now to FIGS. 5 and 6, a shaft assembly 7 is shown for use in guiding paper sheets through a copy or printing machine. The shaft assembly 7 is manufactured by first providing a 8 millimeter stainless steel shaft 2 having a generally cylindrical shape and including grooves 5 for placement of E-rings to secure the shaft assembly 7 within the printing machine. Knurls 3 are machined into the periphery 4 of the shaft 2. Rollers 8 are fitted onto the shaft 2 at the knurls 3 by pressing the hollow rollers 8 onto the shaft 2. This prior art shaft assembly is both heavy and expensive. The use of a solid steel shaft adds significant weight to the shaft assembly and the machining requirement of the knurls as well as the assembly time to assemble the rollers 8 to the shaft 2 adds manufacturing and assembly costs to the shaft assembly 7.

Attempts have been made to provide shaft assemblies with reduced weight and manufacturable at a lower cost. One such attempt is the use of a two-component or composite shaft process. The composite shaft process may be more fully understood with reference to U.S. Pat. No. 5,439,916, U.S. Pat. No. 5,876,288, and U.S. Pat. No. 5,683,641, all to Jaskowiak and assigned to the same assignee as the present invention. The composite shaft process utilizes a hollow metal tube to which slits or holes are machined through the wall of the tube. The tube is placed in a molding machine and hard moldable material is injected into the opening on the end of the tube and permitted pass through the apertures in the periphery of the tube to fill functional features formed in a mold cavity. While the composite shaft process provides for improved performance and reduce costs, the use of a cylindrical metal tube adds costs to the shaft assembly and the requirement of machining the apertures in the periphery of the tube further adds costs to the process. Further, the design of the composite shaft is limited by the fact that the tube is typically cylindrical with a generally uniform outer periphery.

The present invention is directed to alleviate at least some of the aforementioned problems.

The following disclosures may be relevant to various aspects of the present invention:

U.S. Pat. No. 4,101,617
Patentee: Friederich
Issue Date: Jul. 18, 1978
U.S. Pat. No. 3,659,434
Patentee: Wolfe
Issue Date: May 2, 1972
U.S. Pat. No. 3,632,263
Patentee: Blanchard
Issue Date: Jan. 4, 1972
U.S. Pat. No. 3,707,113
Patentee: Hein, et al
Issue Date: Aug. 1, 1972
U.S. Pat. No. 3,716,612
Patentee: Schrenk, et al
Issue Date: Feb. 13, 1973
U.S. Pat. No. 3,968,561
Patentee: Oakes, et al
Issue Date: Jul. 13, 1976
U.S. Pat. No. 4,038,359
Patentee: Pendleton
Issue Date: Jul. 26, 1977
U.S. Pat. No. 4,063,429
Patentee: Wilson
Issue Date: Dec. 20, 1977
U.S. Pat. No. 4,169,304
Patentee: Binder
Issue Date: Oct. 2, 1979
U.S. Pat. No. 4,216,634
Patentee: Binder
Issue Date: Aug. 12, 1980
U.S. Pat. No. 4,256,685
Patentee: Vassar
Issue Date: Mar. 17, 1981
U.S. Pat. No. 4,372,668
Patentee: Malachowski et al
Issue Date: Feb. 8, 1983
U.S. Pat. No. 4,380,442
Patentee: Amsel
Issue Date: Apr. 19, 1983
U.S. Pat. No. 4,474,717
Patentee: Hendry
Issue Date: Oct. 2, 1984
U.S. Pat. No. 4,555,225
Patentee: Hendry
Issue Date: Nov. 26, 1985
U.S. Pat. No. 4,600,548
Patentee: Nenna
Issue Date: Jul. 15, 1986
U.S. Pat. No. 4,988,472
Patentee: Orimoto
Issue Date: Jan. 29, 1991
U.S. Pat. No. 5,439,416
Patentee: Jaskowiak
Issue Date: Aug. 8, 1995
U.S. Pat. No. 5,533,247
Patentee: Ishii et al
Issue Date: Jul. 9, 1996
U.S. Pat. No. 5,683,641
Patentee: Jaskowiak
Issue Date: Nov. 4, 1997
U.S. Pat. No. 5,876,288
Patentee: Jaskowiak
Issue Date: Mar. 2, 1999
U.S. Pat. application Ser. No. 09/195,959
Applicant: Jaskowiak
Filing Date: Nov. 19, 1998
EPC-0-248-567
Patentee: Britz
Issue Date: Nov. 19, 1998
Japan Application No. 83-113619
Applicant: Okada
Publication Date: Nov. 19, 1998
Japan Application No. 58-94619
Applicant: Okada
Publication Date: Nov. 4, 1997

U.S. Pat. No. 4,101,617 to Friederich discloses a method for making a hollow shaped body from a thermoplastic resin by injection molding. The method includes injecting an amount of molten resin sufficient for the preparation of the hollow shaped body through an injection nozzle into a mold through an injection aperture in the mold. Gas is injected under pressure through the injection nozzles and aperture to expand and distribute the molten resin over the interior surfaces of the mold.

U.S. Pat. No. 3,632,263 discloses a device for blowing a hollow thermoplastic body manufactured according to the extrusion-blowing process from a continuous vertically extruded tubular parison cut into sections enclosed into separate split moulds disposed beneath the extrusion head. This device is characterized in that a blowing chamber of relatively reduced dimensions is formed in the two mould halves or sections and adapted to retain therein one open end of the parison section when the mould is closed, and that a compressed-gas injection nozzle connected to a source of compressed gas opens into said blowing chamber and is so arranged that the gaseous jet issuing from said nozzle is directed towards said open end of the parison.

U.S. Pat. No. 3,659,434 to Wolfe discloses a tubular shaft having an outer metallic, tubular member filled with resin. The tube is cut to a preselected length and has a central passageway defined by the inner wall of the metal tube. The tube is heated and swaged and an injector nozzle is positioned at one end and resinous material is pumped into the cavity. See Col. 2, lines 26–61.

U.S. Pat. No. 3,659,434 discloses tubular shafting having a metallic outer tubular member and a cellular resinous core is both kinetically and dynamically balanced by drilling holes in the outer metallic tubular member at locations where additional weight is required to balance the shafting. A predetermined amount of molten metal is poured through the drilled holes into the internal portion of the tubular shafting. The molten metal flows through passageways in the cellular resin core and solidifies against the inner wall of the outer metallic tubular member. The passageways formed in the cellular resin are filled with a similar cellular resin and the holes in the outer metallic tubular member are suitably plugged.

U.S. Pat. No. 3,707,113 discloses a piston for use in an axial and/or radial piston hydraulic translating unit, comprising a hollow skirt portion having inner surfaces defining a cavity and filled with a lightweight material, the material retained in place by discontinuous irregularities in the surface of the hollow skirt which mechanically interlock the filler material within the piston.

U.S. Pat. No. 3,716,612 discloses a method is described for making articles of plastic materials; for example, plastic bottles, from a composite of synthetic thermoplastics. Two or more such resinous materials, which have distinct polymeric and physical characteristics, are combined in a way such that they are present in the article in separate phases possessing an apparent plurality of generally commensurately and spirally extending layers of the said resinous materials and in a manner adapted to take full advantage of the resulting combination of properties.

U.S. Pat. No. 3,968,561 discloses a hollow structural member formed of thin sheet steel is formed with one or more longitudinal joints and the interior is filled with a rigid lightweight synthetic plastics foam such as polyurethane. Each joint includes folded lips or flanges which are designed to provide a restricted clearance or gap into which the foaming material penetrates and changes from a cellular to a non-cellular composition and also provides an adhesive bond at each joint and a moisture proof seal.

U.S. Pat. No. 4,038,359 discloses a shaft seal of the type including a metal case and a polytetrafluoroethylene sealing element, is provided with an auxiliary sealing lip by providing a radial flange of the metal case with a plurality of circumferentially spaced-apart apertures therethrough and molding an annular filler ring of synthetic rubber in the space between the sealing element and the metal case such that the rubber also flows through the apertures to the other side of the radial flange of the metal case and forms an auxiliary lip there. The filler ring chemically bonds to the metal case and mechanically bonds to the sealing element to lock the sealing element in place while also forming an auxiliary lip.

U.S. Pat. No. 4,063,429 discloses a pipeline retard, support and protection method wherein a fast-setting expandable foam is placed in a trench at spaced locations below and around a pipeline to create spaced retards and support pads in situ. Each retard and/or support pad is created in the absence of forms or other foam molding means for the expanding foam. The retards may be keyed to the trench walls and base for securement. The system is also adaptable to encapsulating a portion of the pipeline which transverses a roadbed.

U.S. Pat. No. 4,169,304 discloses one or more thin metal sheets are formed as a hollow shell having a longitudinal load-bearing axis. The thin-walled hollow shell is filled with a core of a plastic foaming material including a suitable foaming agent which foams to fill the shell and to exert a force on the shell radially outwardly of the longitudinal axis thereby forming a solid composite column. The radially outward force deflects the shell and permanently places the shell in lateral tension to increase the load bearing capability of the column. When more than one sheet is used, the elongated edge portions of the sheets are configured to loosely interfit with one another when the shell is initially formed, and the plastic foaming material causes a positive locking of the interfitted edge portions. Thus thin, non-load bearing gauge aluminum is converted into a load bearing structural element.

U.S. Pat. No. 4,216,634 discloses a foam filled metal shell building column for dwellings and the like comprises one or more thin metal sheets formed as a hollow shell having a longitudinal load-bearing axis. The thin-walled hollow shell is filled with a core of a plastic foaming material including a suitable foaming agent which foams to fill the shell and to exert a force on the shell radially outwardly of the longitudinal axis thereby forming a solid composite column. The radially outward force deflects the shell and permanently places the shell in lateral tension to increase the load bearing capability of the column. When more than one sheet is used, the elongated edge portions of the sheets are configured to loosely interfit with one another when the shell is initially formed, and the plastic foaming material causes a positive locking of the interfitted edge portions. Thus thin, non-load bearing gauge aluminum is converted into a load bearing structural element.

U.S. Pat. No. 4,256,685 discloses an improved method is described for varying the profile as seen in cross section of an elongated extrudate article. The method provides for varying the profile of an extrusion orifice while an extrudate stock material is being forced through the orifice. An elongated extruded article is formed having a varying profile conforming to the variations in the profile of the extrusion orifice.

U.S. Pat. No. 4,372,668 discloses a reproducing apparatus with a stationary optical system, a reciprocating platen to transport a document across the stationary optical system, a copy sheet feeding apparatus and a copy sheet registration apparatus to feed a copy sheet in synchronism with the transport of a document by the platen. The platen has mechanical means such as a linear cam to actuate the copy sheet registration apparatus and the copy sheet registration apparatus is responsive to the platen actuating means to directly actuate the copy sheet registration apparatus.

U.S. Pat. No. 4,380,442 discloses a rotary flexible coupling has two interleaved sets of input and output driver blocks connected to input and output flanges, respectively. First and second tires of inelastic material are spaced radially inwardly and radially outwardly from the blocks. Each block is connected to each tire by a cylindrical segment of a cylindrical layer of elastomeric material and torque is transmitted from the input blocks to the output blocks via the elastomeric layers and the tires.

U.S. Pat. No. 4,474,717 discloses a method and apparatus for making a twin-wall internally corrugated plastic structural part provided with a smooth, dense, solid, thin walled, non-cellular skin comprising injecting a thermoplastic or resin material into a pair of closed mold members which define a sealed cavity. A small amount of plastic material is initially injected into the cavity with the material impinging upon and being dispersed over the mold members thereby forming a generally continuous thin skin substantially the mold surfaces. Thereafter, successively and intermittently injecting an inert gas under pressure through one mold member during continued injection of the plastic material into the cavity thereby pressurizing the skin against the walls of the mold cavity and progressively co-mingling the inert gas under pressure and the inwardly flowing plastic material as both enter the cavity until the cavity is filled with an internal corrugated body integral with and bonded to the skin. Further steps include cooling the twin-wall internally corrugated structural part to permit the same to solidify as an integral unit and venting the mold cavity to atmosphere to relieve pressure from the corrugated plastic structural part. The intermittent injection of the inert gas introduces minute amounts of pressurized gas into the continuously injected plastic material.

U.S. Pat. No. 4,555,225 discloses a method and apparatus for making a twin-wall internally corrugated plastic structural part provided with a smooth, dense, solid, thin walled, non-cellular skin comprising injecting a thermoplastic or resin material into a pair of closed mold members which define a sealed cavity. A small amount of plastic material is initially injected into the cavity with the material impinging upon and being dispersed over the mold members thereby forming a generally continuous thin skin substantially the mold surfaces. Thereafter, successively and intermittently injecting an inert gas under pressure through one mold member during continued injection of the plastic material into the cavity thereby pressurizing the skin against the walls of the mold cavity and progressively co-mingling the inert gas under pressure and the inwardly flowing plastic material as both enter the cavity until the cavity is filled with an internal corrugated body integral with and bonded to the skin. Further steps include cooling the twin-wall internally corrugated structural part to permit the same to solidify as an integral unit and venting the mold cavity to atmosphere to relieve pressure from the corrugated plastic structural part. The intermittent injection of the inert gas introduces minute amounts of pressurized gas into the continuously injected plastic material.

U.S. Pat. No. 4,600,548 discloses a method of forming the primary core of a concrete pipe. A steel cylinder is disposed vertically on the base of the pipe forming machine. A conventional rotary packerhead having a diameter less than the inner diameter of the steel cylinder is lowered concentrically to the bottom thereof. Concrete is then introduced within the steel cylinder through the upper end thereof. The packerhead is rotated to force the concrete into the annular gap between the packerhead and the steel cylinder. As the primary core is formed, the packerhead is raised and rotated while concrete is introduced within the steel cylinder, thereby forming a primary core consisting of a steel cylinder having an inner lining of concrete. In an alternative embodiment, the steel cylinder is completely embedded within the concrete.

U.S. Pat. No. 4,988,472 discloses a method of inserting a piece into a mold for molding a mouth of a preform which utilizes a cavity surface of a mold for molding an outer side of a mouth and a cavity recess for molding a support ring to support a heat resistant short tubular piece within the mold, wherein spacers in the form of projections are integrally formed at fixed intervals on the outer side of the piece and the fore end of the projection. The piece is inserted into a central portion of an opened mold for molding a mouth, after which the mold is closed, the projections are inserted into the cavity recess, the spacers are pressed against the cavity surface, and the piece is held and secured to the central portion of the cavity by the mold through the spacers.

U.S. Pat. No. 5,439,416 discloses a shaft assembly comprising an elongated member having at least a portion which is hollow, tubular, shell like having an inside surface defining a shaft core and an outside surface defining a shaft functional surface, the shaft core being filled with a hardened, moldable material, and the shaft functional surface having at least one functional feature thereon, which is of hardened, moldable material integrally molded with the hardened, moldable material in the shaft core. In a preferred embodiment the shaft assembly is rotatable and has at least one molding aperture gate extending through the shaft from the inside surface to the outside surface which is filled with hardened, moldable material which connects the hardened material in the shaft core and functional feature.

U.S. Pat. No. 5,533,553 discloses a method for molding a lead screw for converting a rotational movement into a linear movement, there are provided a method and a die assembly which may involve the steps of forming a plurality of holes in a wall of a tube in a spiral arrangement, preparing a metallic die assembly provided with a cavity defining a thread groove adapted to form the thread crest matching in position with an array of the holes, placing the tube in the cavity, and injecting synthetic resin material into the cavity so that the synthetic resin material may flow in two separate flows, one flowing inside the core tube, and the other flowing along the outer surface of the core tube. The thread crest is connected to the synthetic resin material filled in the core tube, and can be securely attached to the core tube. Optionally, an annular rotor may be fitted onto the base end portion of the lead screw. The synthetic resin material is first filled into the annular gap defined around the annular rotor before it is filled into the interior of the annular rotor so that the rotor may be prevented from being damaged by the tensile stress produced by internal pressure acting on the annular rotor.

U.S. Pat. No. 5,683,641 discloses a shaft assembly comprising an elongated member having at least a portion which is hollow, tubular, shell like having an inside surface defining a shaft core and an outside surface defining a shaft functional surface, the shaft core being filled with a hardened, moldable material, and the shaft functional surface having at least one functional feature thereon, which is of hardened, moldable material integrally molded with the hardened, moldable material in the shaft core. In a preferred embodiment the shaft assembly is rotatable and has at least one molding aperture gate extending through the shaft from the inside surface to the outside surface which is filled with hardened, moldable material which connects the hardened material in the shaft core and functional feature.

U.S. Pat. No. 5,876,288 discloses a shaft assembly comprising an elongated member having at least a portion which is hollow, tubular, shell like having an inside surface defining a shaft core and an outside surface defining a shaft functional surface, the shaft core being filled with a hardened, moldable material, and the shaft functional surface having at least one functional feature thereon, which is of hardened, moldable material integrally molded with the hardened, moldable material in the shaft core. In a preferred embodiment the shaft assembly is rotatable and has at least one molding aperture gate extending through the shaft from the inside surface to the outside surface which is filled with hardened, moldable material which connects the hardened material in the shaft core and functional feature.

U.S. patent application Ser. No. 09/195,959 discloses a shaft assembly including an elongated member having at least a portion which is hollow having an inside surface defining a shaft core is provided. The shaft assembly has an outside surface defining a shaft functional surface. The shaft core is filled with a hardened, moldable material. The shaft functional surface has at least one functional feature thereon which is of hardened, moldable material integrally molded with the hardened, moldable material in the shaft core. The coefficient of thermal expansion of the hollow portion and the shrink rate of the moldable material are selected to provide intimate contact between the hardened moldable material and the hollow portion.

EPC 0-248-567 discloses a discloses a method of making a hand tool for percussive use. The method includes locating a hollow elongate handle member in a head shaped cavity so that a portion of the handle member protrudes from the cavity. A settable polymeric material is introduced into the cavity and into the inside of the handle member. The material forms the head of the hand tool in the mold cavity.

Japan Application No. 83-113619 discloses a functional shaft composed of a cylinder, a functional member and a synthetic resin section. The synthetic resin section includes sections inside and outside the cylinder and both are connected to each other through apertures in the cylinder.

Japan Application No. 58-94619 discloses a power transmission shaft including a cylindrical body and synthetic resin portions which are located inside and outside the cylindrical body and which are integrally provided with the cylindrical body through holed in the cylindrical body.

All the above references totally incorporated herein by reference.

Additional progress in terms of cost and weight of the shaft assemblies has been observed in certain machines which use hollow drive shafts with molded or otherwise separately fabricated functional features such as, gears and rolls which are then manually placed on the shaft and secured in position.

SUMMARY OF THE INVENTION

In particular, in one embodiment of the invention, a shaft assembly including an elongated member having at least a portion which is hollow having an inside surface defining a shaft core is provided. The shaft assembly includes a rotatable, torque transmitting elongated member defining a portion thereof which is hollow having an inside surface and defining a shaft core. The shaft has an outside surface including a torque transmitting portion and a functional feature portion. The elongated member defines an aperture gate extending from the inside surface to the outside surface. The elongated member also defines a hardened, moldable material. The material extends from the inside surface through the aperture gate. The material is secured to at least a portion of the outside surface.

In another embodiment of the invention, an apparatus including mechanical components capable of performing at least one operation requiring the use of a shaft assembly is provided. The shaft assembly includes a rotatable, torque transmitting elongated member defining a portion thereof which is hollow having an inside surface defining a shaft core. The shaft has an outside surface including a torque transmitting portion and a functional feature portion. The elongated member defines an aperture gate extending from the inside surface to the outside surface. The shaft assembly also includes a hardened, moldable material. The material extends from the inside surface through the aperture gate. The material is secured to at least a portion of the outside surface.

In another embodiment of the invention, a process for making a rotatable shaft assembly for transmitting torsional torque having at least one functional feature on an outside surface of the shaft. The process includes the steps of gas injection molding an elongated member having at least a portion which is hollow having an inside surface defining a shaft core and an outside surface defining a shaft functional surface, providing the elongated member with an aperture gate extending from the inside surface to the outside surface, placing the hollow portion in a mold which has a cavity for the at least one functional feature on the outside surface of said portion, filling the mold with a hardenable, moldable material, flowing the moldable material through the shaft core and cavity, permitting the moldable material to harden to form the functional feature, and removing the shaft assembly with the functional feature from the mold.

For a better understanding, as well as other objects and further features thereof, references is had to the following drawings and descriptions.

DESCRIPTION OF PREFERRED EMBODIMENT

Figure 3:
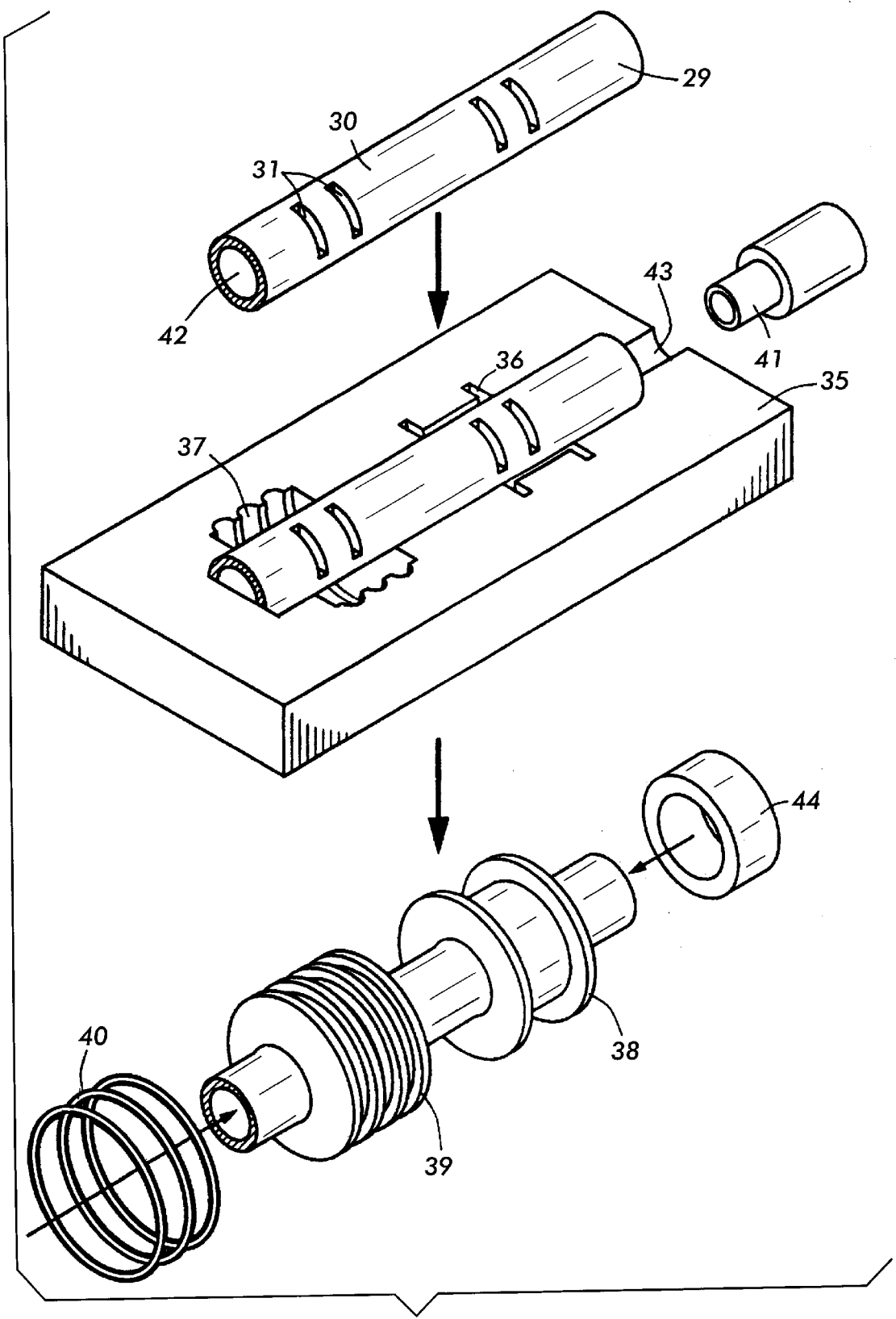
FIG. 3 is a perspective view illustrating a composite molding shaft process utilized with the present invention.

Attention is now directed to FIG. 3 for a general over view of a process which may be used with the present invention and an illustrative composite shaft assembly produced thereby. The composite shaft process may be more fully understood with reference to U.S. Pat. No. 5,439,416, U.S. Pat. No. 5,876,288, and U.S. Pat. No. 5,683,641, all to Jaskowiak and assigned to the same assignee as the present invention, these references totally incorporated by reference. As therein illustrated, a section of an elongated member 29 has hollow, tubular, shell like portion 30 having an outside surface 32 having a plurality of molding aperture gates 31 formed therein extending along the shaft from the inside surface 42 to the outside surface 32. While the process and apparatus of the present invention may be most suitably utilized with a molded plastic elongated member, for a basic understanding of the composite shaft process, a metal tube is shown in FIG. 3. For example, the shafts may be paper path nip shafts. The tube 29 may be laser machined after which the hollow tubing is placed in a mold 35 having cavities 36 and 37 for two functional features therein, illustrated as a pulley 38, and a support 39 for elastomer O-rings 40 to be subsequently added. The mold 35 is subsequently closed and a hardenable, moldable material injected from nozzle 41 into the mold with the hardenable material flowing through the core 43 defined by the inside surface 42 of the hollow tubing through the molding aperture gates 31 and into the mold cavities 36 and 37 to form the pulley 38 and elastomer O-rings support 39. During this molding process it is important to note that the hardenable, moldable material is fluid and flows through the core and is in flowing communication with the mold cavity by means of the aperture gate.

When the hardenable material has hardened the mold is opened and the composite shaft assembly is removed. The composite shaft may then be surface heated or otherwise finished with conventional techniques. As illustrated, additional items as desired may now also be added to the assembly, including an elastomer band 44 and elastomer O-rings 40.

Figure 4:
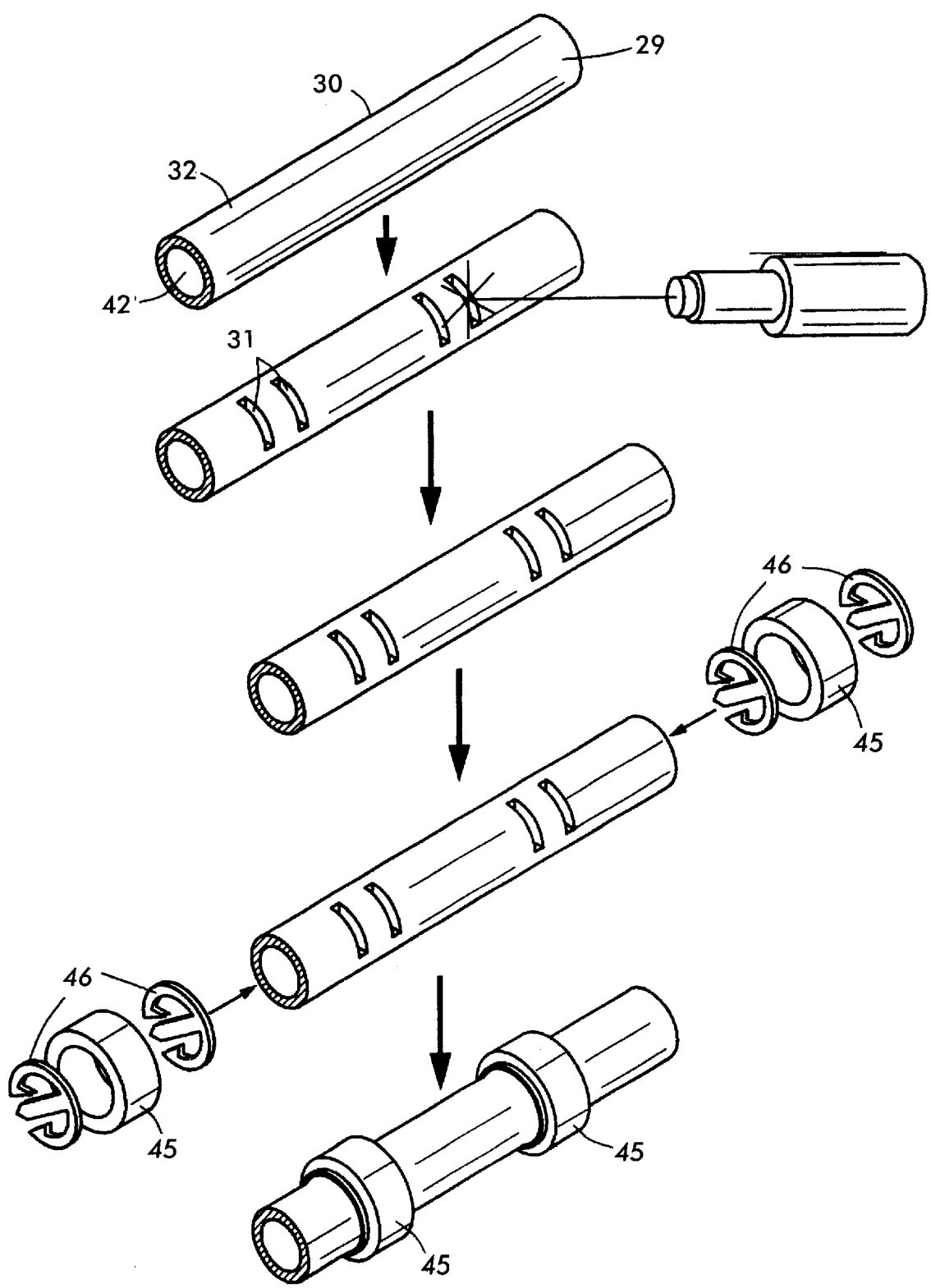
FIG. 4 is a perspective view illustrating a prior art hollow shaft assembly technique.
Figure 5:
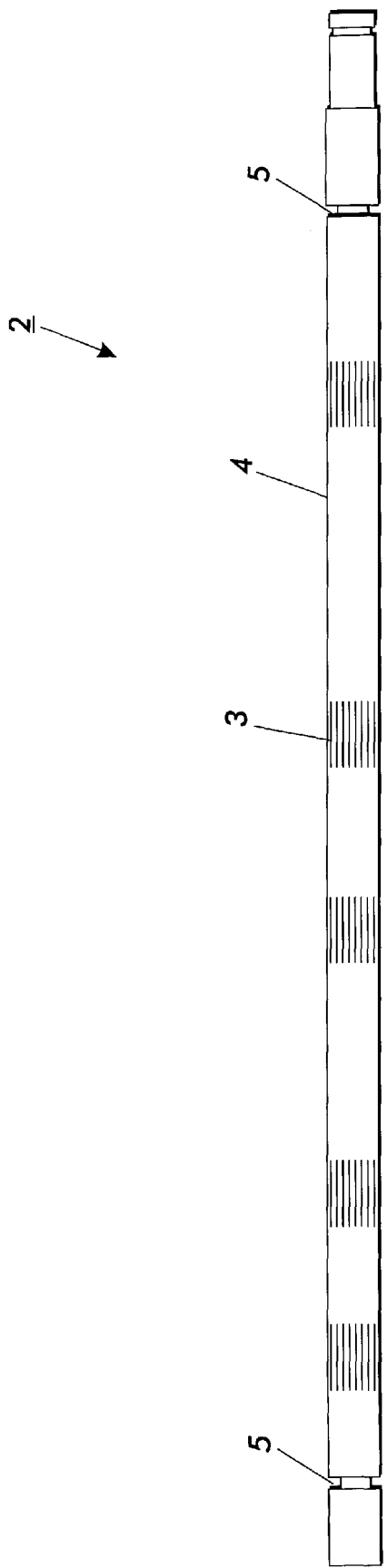
FIG. 5 is an elevational view of a prior art splined shaft.
Figure 6:
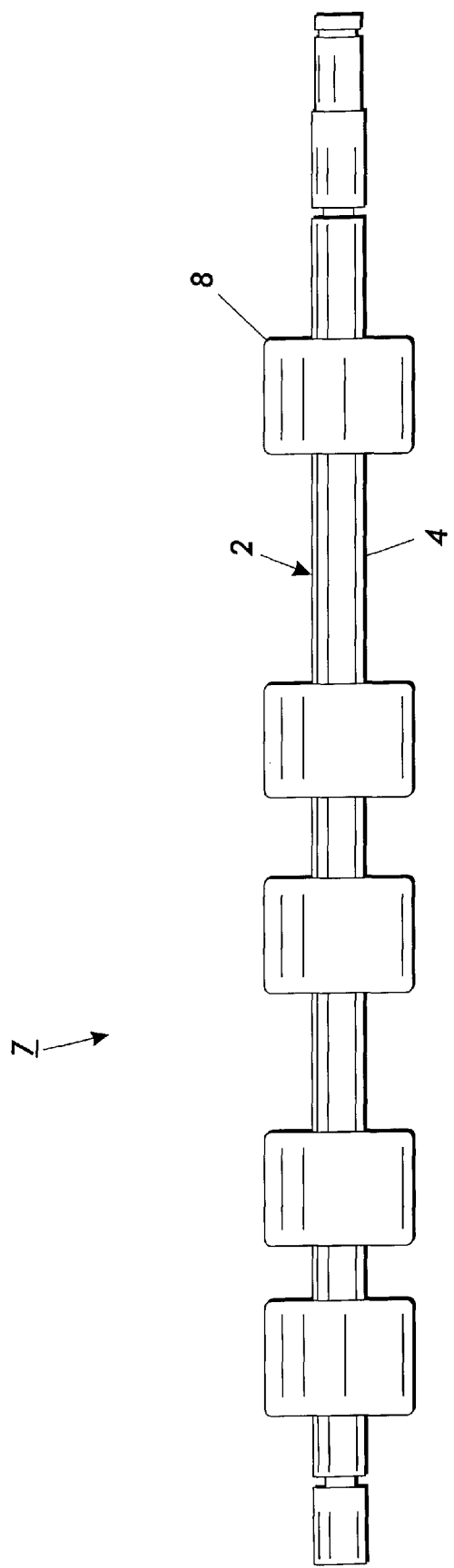
FIG. 6 is an elevational view of the FIG. 5 shaft with rollers pressed thereon from a prior art shaft assembly.

With reference to FIG. 4, this process is in sharp contrast to prior art practices wherein the individual functional features there illustrated as two pulleys 45 were separately added to a shaft assembly and secured in place on both inboard and outboard sides by means of two fasteners 46. Typically, all the steps in this operation would be separately and manually performed.

Figure 1:
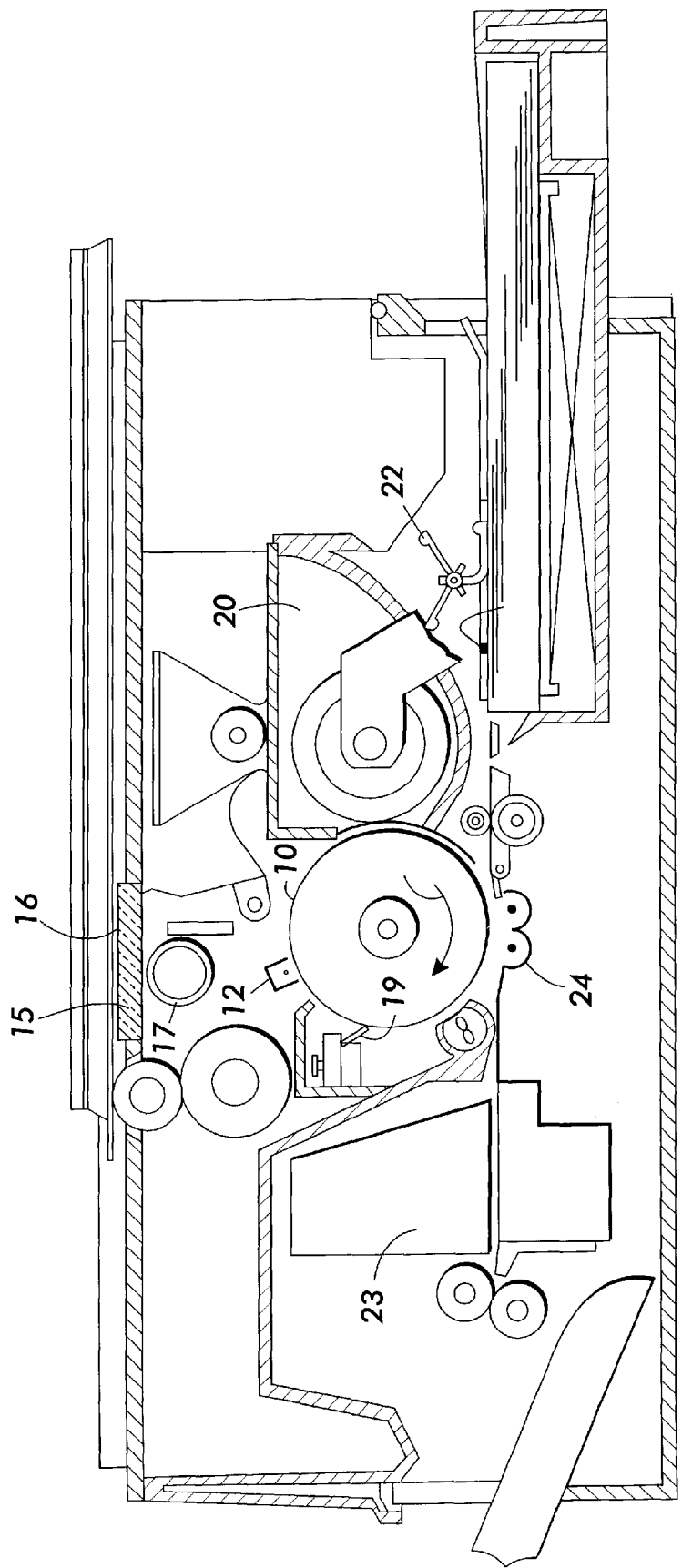
FIG. 1 is a schematic representation in cross section of the operational elements of an automatic reproducing machine having several shaft assemblies.
Figure 2:
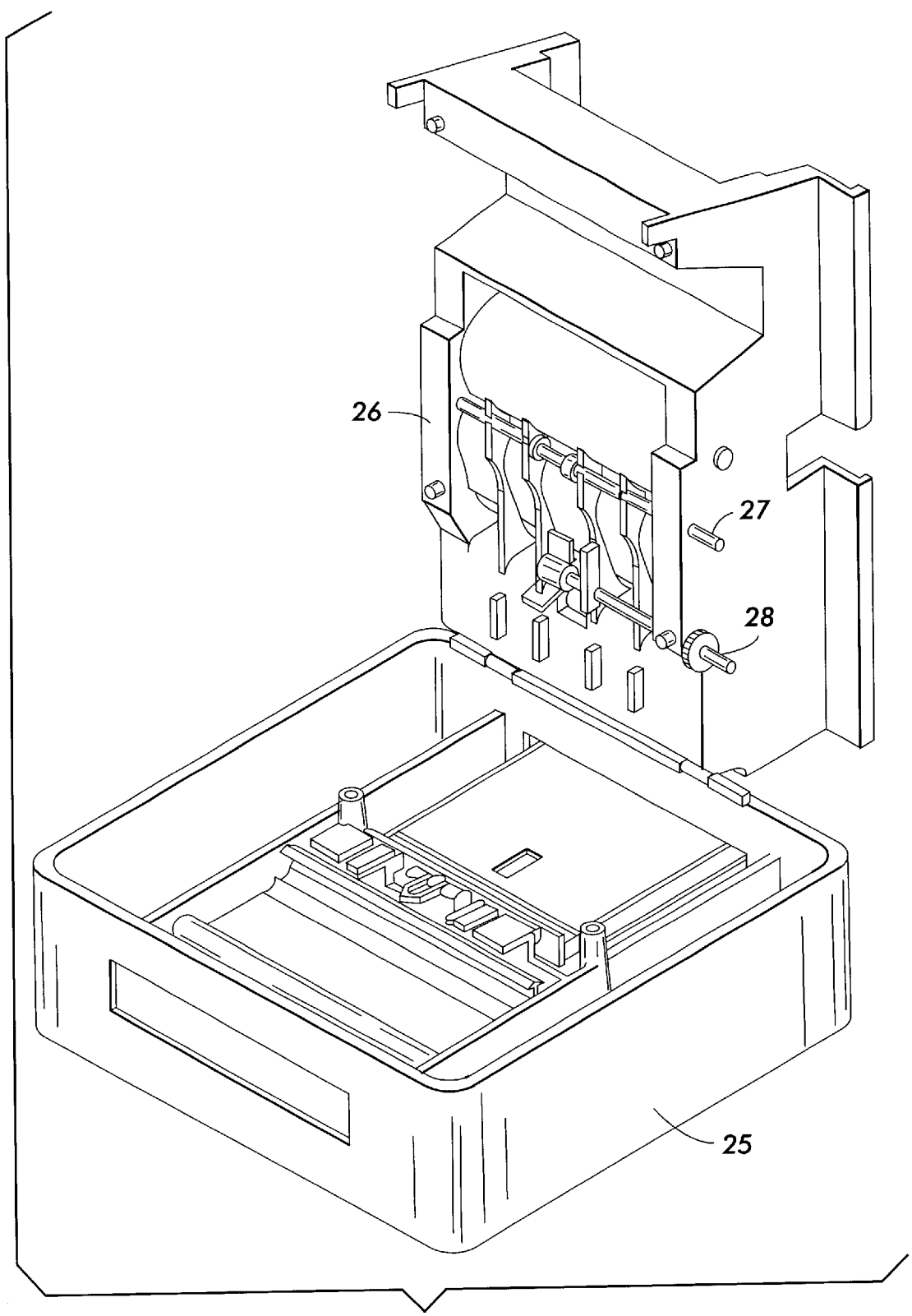
FIG. 2 is an isometric view of the upper and lower frame members which may have several shaft assemblies according to the present invention.

The shaft assemblies may be stationary or rotatable depending on the specific application. In the particular application, illustrated in FIGS. 1 and 2, most of the shaft assemblies are typically used to provide drives in document transports and print substrate transports, which may be simple to complex in operation and short to long in transport path distance and are therefore rotatable. In addition, they may have specific application in cleaner, fuser, developer and optics housing. The integrally molded features may be drive features such as gears, rolls and pulleys, location features such as snap fittings, holes or stops or other functional features such as bearings, bushings, journals, idlers, O-rings, flanges, frames, etc.

The elongated member having at least a portion which is hollow, tubular, and shell like, can be of virtually any cross section or made of any suitable material. Typically, the tubular portion is circular but it may just as well have any shape including geometric shapes such as, for example, triangular or rectangular shapes. It may also be a seamless member or a seamed member. It may take the form of a protrusion or an extrusion, including one or more grooved or geometric support members on the interior of the composite shaft. Suitable material include carbon steel, aluminum, copper, stainless steel, other steel alloys and composite materials or plastic material such as, for example a Teflon® tube (Teflon is a trademark of E.I. duPont deNemours Co.). The composite materials utilized for the elongated member may include those which are electrically conductive as well those which are non conductive and semi conductive. For example, the composite materials may include pultrusions as disclosed in U.S. Pat. No. 5,354,607 to Swift, this reference totally incorporated herein by reference. The composite materials may include a glass filament pultrusion and a carbon doped glass filament pultrusion. Theoretically, there are few, if any dimensional limits on the inside diameter or outside diameter of, for example, a cylindrical tube, nor on the thickness of the wall it being noted that however, as a practical matter the smaller the internal diameter and longer the shaft the more difficult it is to insure that the flowable plastic will fill the entire shaft core aperture gates and mold cavities.

The hardenable, moldable material may be selected from a wide variety of materials which can be handled in a molding process and provide the characteristics and properties to the functional features including high or low friction, specific electrical properties, lubricity and the like. Typical injection moldable or castable materials include the thermoplastic. Typical thermoplastic resins include polyethylene, polystyrene, polypropylene, polyurethane, polyvinylchloride, nylons, polycarbonate ABS, as well as certain fluorocarbons, such as Teflon. Typical thermosetting resins include acrylics, phenolics and polyesters. The moldable material may be used in a filled or unfilled form and may be filled with materials to impart selected properties such as fire retardancy to the functional feature or rest of the shaft assembly. If desired, the moldable material may be foamed with the use a conventional blowing agent as in the case of, for example, microcellular polyurethane. Further, the moldable material may be filled or unfilled with, for example, up to 30 parts by weight glass fibers per 100 parts by weight resin and may have added other ingredients for selected properties, such as pigments to impart a particular color or other materials for desired properties.

The molded material may be in the form of a elastomer, for example in the form of a thermoplastic elastomer.

The molding aperture gates may be formed in any suitable shape in the hollow, tubular, shell with any suitable process. Typically, they may be drilled, punched, cut, laser machined, formed with a water jet or electrochemical machine and may be in the form of a round hole, shaped aperture slit or other suitable shape. It is important that the holes, gates or ports are sufficiently large and present in sufficient number to enable a flowable material to pass through them from the core into the cavity forming the functional feature on the hollow, tubular shell. If the holes, gates, or ports are integrally molded with the tube, a simple circular hole may be most easily implemented. In this regard it should be noted that a mold cavity may form a functional feature on an end of the tubular shell. In addition, while not critical, but beneficial, depending on the particular application of the shaft assembly, it may be desirable to select the materials from which the hollow, tubular, shell like member and the hardened material are made such that the coefficient of thermal expansion of the hollow, tubular, shell like portion and the shrink rate of the thermoplastic are such as to provide intimate contact between the hardened thermoplastic and the tubular shell like portion. For example, an integral, external roll feature would preferably have intimate contact with the outside diameter of the shell like portion which may, therefore, in the final analysis contribute to enhanced beam strength.

Figure 7:
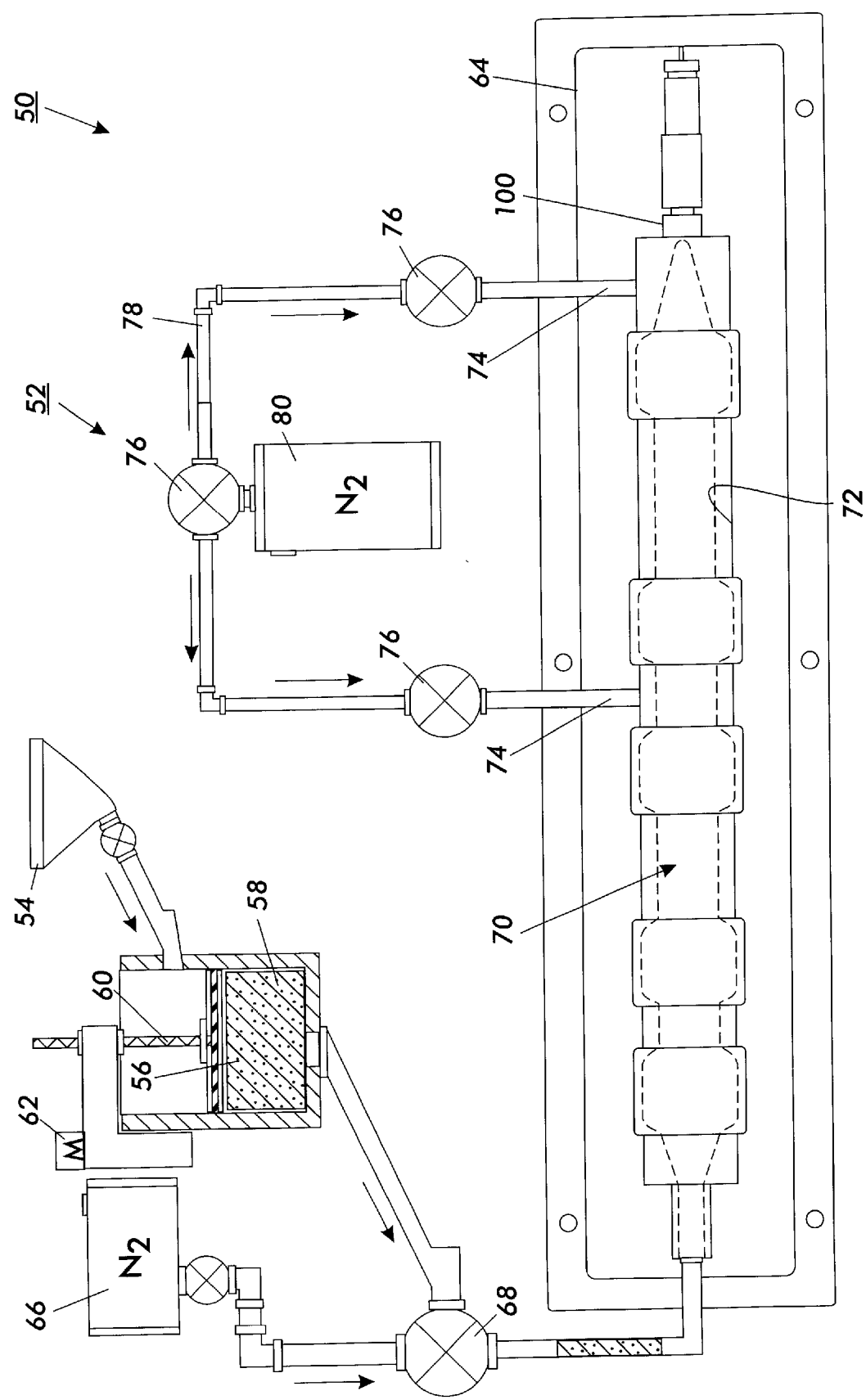
FIG. 7 is a schematic representation partially in cross section of a molding apparatus for use in molding a shaft for the shaft assembly according to the present invention.

Referring now to FIG. 7, a gas-assisted molding apparatus 50 is shown for molding a gas-assisted produced hollow shaft 100 according to the present invention. For example, the shaft 100 may be a paper path nip shaft. The gas-assisted molding apparatus 50 may be more fully understood with reference to U.S. Pat. No. 3,632,263 to Blanchard; U.S. Pat. No. 4,474,717 and U.S. Pat. No. 4,555,225, both to Hendry. An alternative gas-assist molding process may be is more fully understood with reference to U.S. Pat. No. 4,101,617 to Friederich. These references totally incorporated herein by reference.

The gas-assisted molding apparatus 50 may include a molding machine 52 in the form of, for example, a 6 ounce, 100 ton Engel Injection Molder provided by Engel Machinery Company, 3740 Board Road, York, Pa. 17402. The molding machine 52 includes a hopper 54 for supplying a supply of moldable material 56. The moldable material from the hopper 54 enters a piston chamber 58 where screw 60 driven by motor 62 is utilized to feed the moldable material 56 into a mold 64. The mold 64 is a mirror image of the part to be molded as the interior of the mold forms the exterior of the part to be molded. The mold 64 should have gentle radii for assisting in the injection gas molding process. Nitrogen from a first gas supply 66 is mixed with the moldable material 56 in mixing valve 68. A mixture of the nitrogen and the moldable material 56 enter the cavity 70 of the mold 64 and is urged along periphery 72 of the mold cavity 70 forming a hollow shaft 100. Excess moldable 56 expands into overflow chambers 74 in the mold 64. The overflow chambers 74 are connected by valves 76 and conduits 78 to a second nitrogen gas supply 80. The use of the gas-assist molding apparatus provides for a hollow shaft 100.

The Applicant has found that the molding of long thin shafts is best performed by orienting the mold 64 with the longitudinal axis of the shaft 100 in a vertical orientation and filling the material 56 from the lower end of the mold 64.

Figure 8:
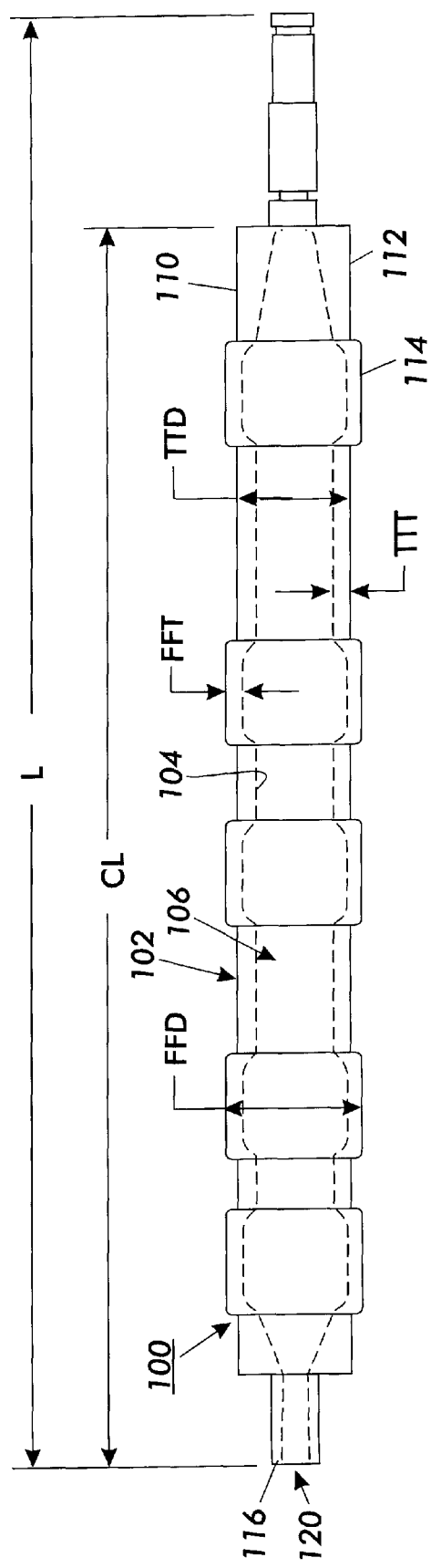
FIG. 8 is an elevational view partially in cross section of an embodiment of a shaft for the shaft assembly according to the present invention which may be molded in the molding apparatus of FIG. 7.

Referring now to FIG. 8, the shaft 100 is shown in greater detail. Preferably and as shown in FIG. 8, the shaft 100 is a rotatable, torque transmitting, elongated member. A portion 102 of the shaft 100 is hollow. The hollow portion 102 has an inside surface 104 which defines a shaft core or cavity 106. The elongated member 100 has an outside surface 110 which includes a torque transmitting portion 112 and a functional feature portion 114. Preferably and as shown in FIG. 8, the elongated member 100 has one piece construction. The shaft core or cavity 106 may be later utilized as a runner for the molding process as taught by Jaskowiak.

Preferably and as shown in FIGS. 7 and 8, the elongated member 100 is made by the gas-injection process as shown in FIG. 7.

The elongated member 100 may be made of any suitable durable material and is preferably made of a moldable plastic. When made of a moldable hardenable plastic, the material may be selected from a wide variety of materials which can be handled in a molding process and provide characteristics and properties suitable for the application. Included among moldable and castable materials are thermoplastics and thermosetting resins. Typical thermoplastic resins include polyethylene, polystyrene, polypropylene, polyurethane, polyvinyl chloride, nylons, polycarbonate ABS, as well as certain fluoro carbons such as polytetrafluoroethylene.

Typical thermal setting resins may include acrylics, phenolics and polyesters. When utilized to provide a shaft for a paper feed roll, certain materials are particularly well suited for the shaft 100. For example, the material may be Acetal, ABS (Acrylonitrile Butadiene Styrene), SPS (Syndiotactic Polystyrene), glass filled SPS, with a glass content of, for example, 40% or polycarbonate.

While the moldable material may be filled with, for example, glass, many materials may be utilized to impart selected properties such as fire retardancy to the functional feature portion 114 or to the torque transmitting portion 112. The glass fiber content may be in excess of 40% by weight per 100 parts of weight resin. Other ingredients, it should be appreciated may also be added such as pigments which impart a particular color or other materials for desired properties.

The elongated member 100 may have length L which may be at least ten times greater than outer diameter FFD of the functional feature portion 114 of the elongated member 100. For example, as shown in FIG. 8, the elongated member 100 may have a length L of, for example, around 17 inches. The functional feature portion 114 of the shaft 100 has a diameter FFD of, for example, 0.75 inches. Thus, as shown in FIG. 8, the elongated member 100 has length to diameter ratio of L÷FFD of approximately 22.7 to 1.

The shaft core 106 may extend as shown in FIG. 8 from first end 116 of the member 100 a distance CL of, for example, approximately 14 inches. While, as shown in FIG. 8, the shaft core 106 extends from aperture 120 located on first end 116 extends partially along the length of the shaft 100. The shaft core 106 is preferably formed by the gas-injection molding process. It should be appreciated that the cavity length CL may be equal to the total length L of the elongated member 100. As shown in FIG. 8, the cavity length CL is somewhat shorter than the overall length L in order that a portion of the elongated member 100 may be solid in that that portion of the elongated member may be smaller in diameter and may be subjected to increased forces requiring the added strength of a solid shaft portion.

One benefit of utilizing a gas-injected molding process for the manufacture of the elongated member 100 is that the plastic material utilized to form the elongated member 100 may have a somewhat uniform thickness to along the outside surface 110 of the member 100. This phenomenon is caused by equalization of the pressure within the gas-assist molding process. This equalization of pressure causes a somewhat uniform thickness between the cavity 106 and the periphery 72 of the mold 64 (see FIG. 7). Therefore, as shown in FIG. 8, the functional feature portion 114 may have a functional feature thickness FFT of, for example, 0.03 to 0.09 inches while the torque transmitting portion 112 may similarly have a torque transmitting thickness of, for example, 0.03 to 0.09 inches.

While as shown in FIG. 8, each of the five functional feature portions 114 and the four torque transmitting portions 112 of the elongated member 100 have circular cross sections, it should be appreciated that both the functional feature portion and the torque transmitting portion may take on any shape which may be molded within a molding machine and each of the of the five functional feature portions 114 and the four torque transmitting portions 112 may have shapes different from the other portions 112 and 114. For example, the functional feature portion 114 and the torque transmitting portion 112 may be square, triangular, or have any geometric shape which may be molded.

Further, while each of the functional feature portions 114 and the torque transmitting portions 112 has similar diameters, FFD and TTD, respectively, it should be appreciated that each of the functional feature portions 114 and the torque transmitting portions 112 may have a different size and shape. Similarly, the torque transmitting portions 112 while generally having a similar cross section as shown in FIG. 8, may each be of different sizes and shapes. While as shown in FIG. 8, the elongated member 100 is in the form of a feed roller, for example a paper nip feed roller, it should be appreciated that the elongated member 100 may be in the form of an auger, a drive dog, a shaft and pulley assembly, a shaft and gear assembly, a squirrel-cage type fan or any type of mechanical component including an elongated member.

Figure 9:
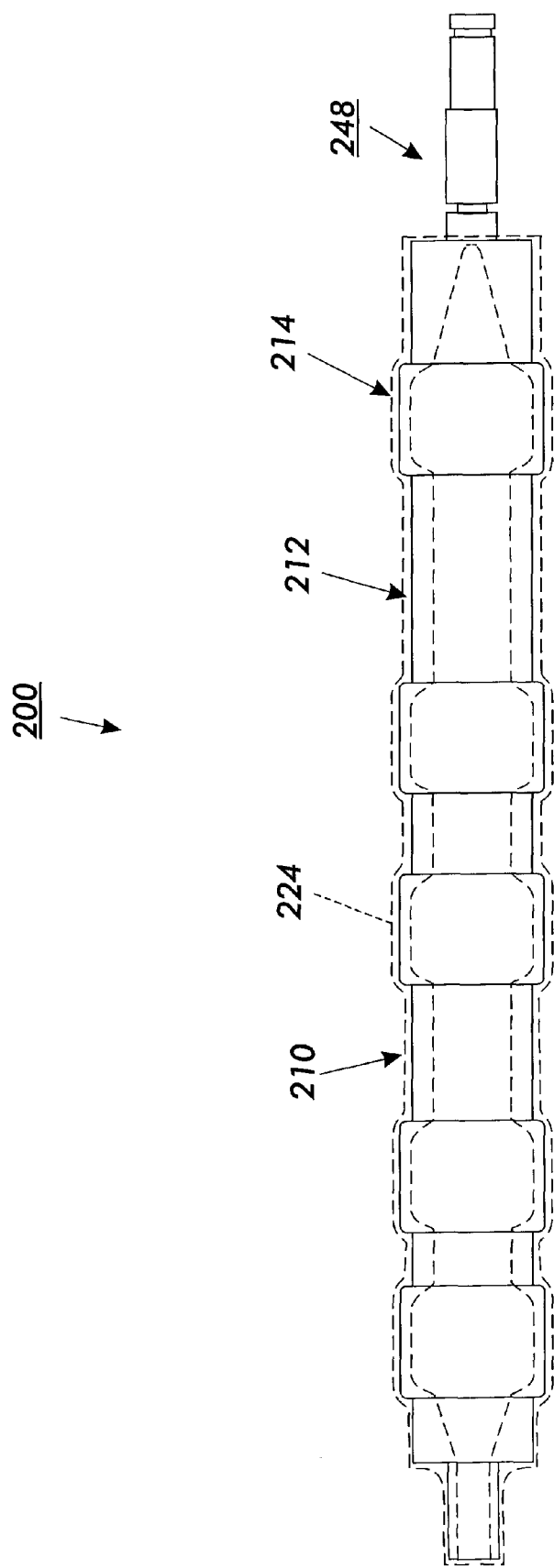
FIG. 9 is an elevational view partially in cross section of the FIG. 8 shaft with a coating applied to the periphery thereof.

Referring now to FIG. 9, an alternate embodiment of the present invention is shown as shaft 200. Shaft 200 includes an elongated member 248 which is similar to the elongated member 100 of FIG. 8. The shaft 200 may for example be utilized as a drive roll, for example a paper nip drive roll. Elongated member 248 includes both a torque transmitting portion 212 and a functional feature portion 214. The shaft 200 of FIG. 9, unlike the elongated member 100 of FIG. 8, further includes a coating 224 which may be applied to outer surface 210 of the elongated member 100 and may be applied to either the functional feature portion 214 or the torque transmitting portion 212. It should be appreciated that the coating 224 may be applied to a portion of one of the portions 212 or 214 or to both portions 212 and 214.

The coating 224 may be any suitable material which may adhere to the elongated member 248. The coating 224 may be utilized to increase the coefficient of friction of the functional feature 214 to provide improved paper driving capability for the drive roll 200. The functional feature 214, may for example be a paper drive roll, wheel or tire. For example, the coating 224 may be made of a silicone or a thermoplastic elastomer, TPE, such as a metallocene-catalyzed polyolefin. Other materials such as polyurethane and isoprene may likewise be utilized to increase the coefficient of friction on the shaft 200.

The coating 224 may be applied to the elongated member 248 in any suitable fashion. For example, the coating 224 may be applied by spraying, dipping, painting, or by, for example, a spiral coating process as more fully described in U.S. Pat. No. 5,71,832 to Finn and incorporated totally herein by reference. The use of a dip or other type of general coating method may most simply provide for a uniform coating along the entire periphery of the elongated member 248. Masking of certain areas may be utilized to prohibit the coating on certain portions of the periphery of the elongated member 248. Alternatively, utilizing spraying, painting and other methods, may permit the selective coating of certain portions of the elongated member 248, for example, the functional feature portion 214 of the elongated member 248 may be coated to provide for frictional drive of the functional feature 214.

Another alternate embodiment of the present invention is shown as shaft 300. Shaft 300 includes an elongated member 348 which is similar to the elongated member 248 of FIG. 9. In fact, the elongated member 348 may, in fact, be identical to the elongated member 248. The elongated member 348 defines a hollow portion 302 there within. The hollow portion 302 extends inwardly from aperture 320 located on first end 316 of the elongated member 348. The elongated member 348 includes functional feature portion 314 and a torque transmitting portion 312. The elongated member 348 is slightly different than the elongated member 248 of FIG. 9 in that elongated member 348 includes aperture gates 360 positioned in for example the functional feature portion 314 of the elongated member 348 and extending from inside surface 304 to outside surface 310 of the member 348.

The aperture gates 360 may be formed in any suitable shape with any suitable process. Typically, they may be drilled, punched, cut, laser machined, formed with a water jet or electrochemically machined. The aperture gates 360 may be in the form of round holes, shaped aperture slits or other suitable shapes. It is important that the aperture gates are sufficiently large and in sufficient number to enable the proper flowing of material therethrough.

The shaft 300 further includes harden moldable material 364. The material 364 is positioned at least partially within hollow portion 302 of the elongated member 348. The hard moldable material 364 is typically applied to the elongated member 348 through the use of the composite shaft molding process as shown in FIG. 3 and as more fully described in U.S. Pat. No. 5,439,416, U.S. Pat. No. 5,683,641, and U.S. Pat. No. 5,876,288, all to Jaskowiak and assigned to the same assignee as the present invention.

Figure 10:
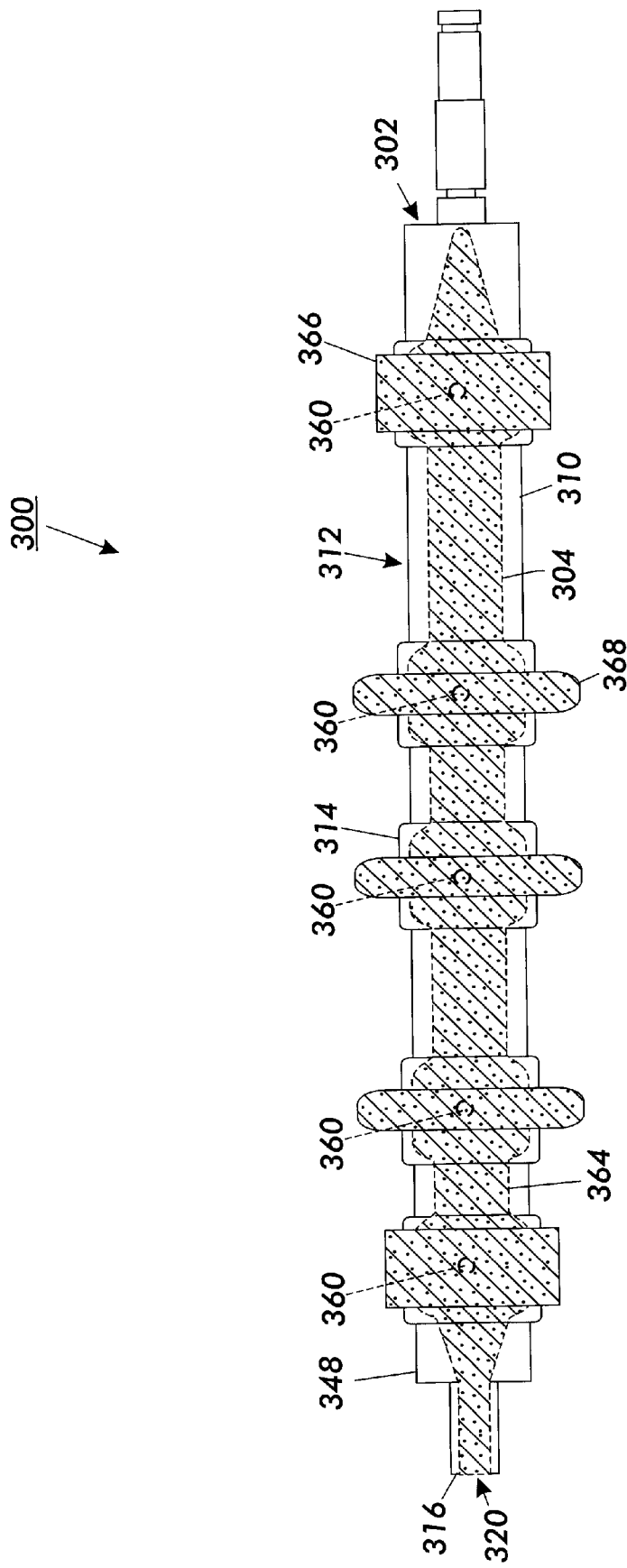
FIG. 10 is an elevational view partially in cross section of the FIG. 8 shaft with rollers mounted on the periphery thereof.

Preferably, and as shown in FIG. 10, the hard, moldable material 364 enters the elongated member 348 through aperture 320 in first end 316 of the member 348. The material 364 fills the hollow portion 302 and passes through the member 348 to form first type rollers 366 and second type rollers 368. The material utilized for the elongated member 348 is preferably chosen with a thermal expansion and the shrink rate of the moldable material 364 is chosen such that after the molding process intimate contact is provided between the hard moldable material 364 and the hollow portion 302 of the elongated member 348. An integral external roll feature would preferably have intimate contact with the outside diameter of the hollow portion 302 which may, therefore, contribute to enhance beam strength for the elongated member 348.

Figure 11:
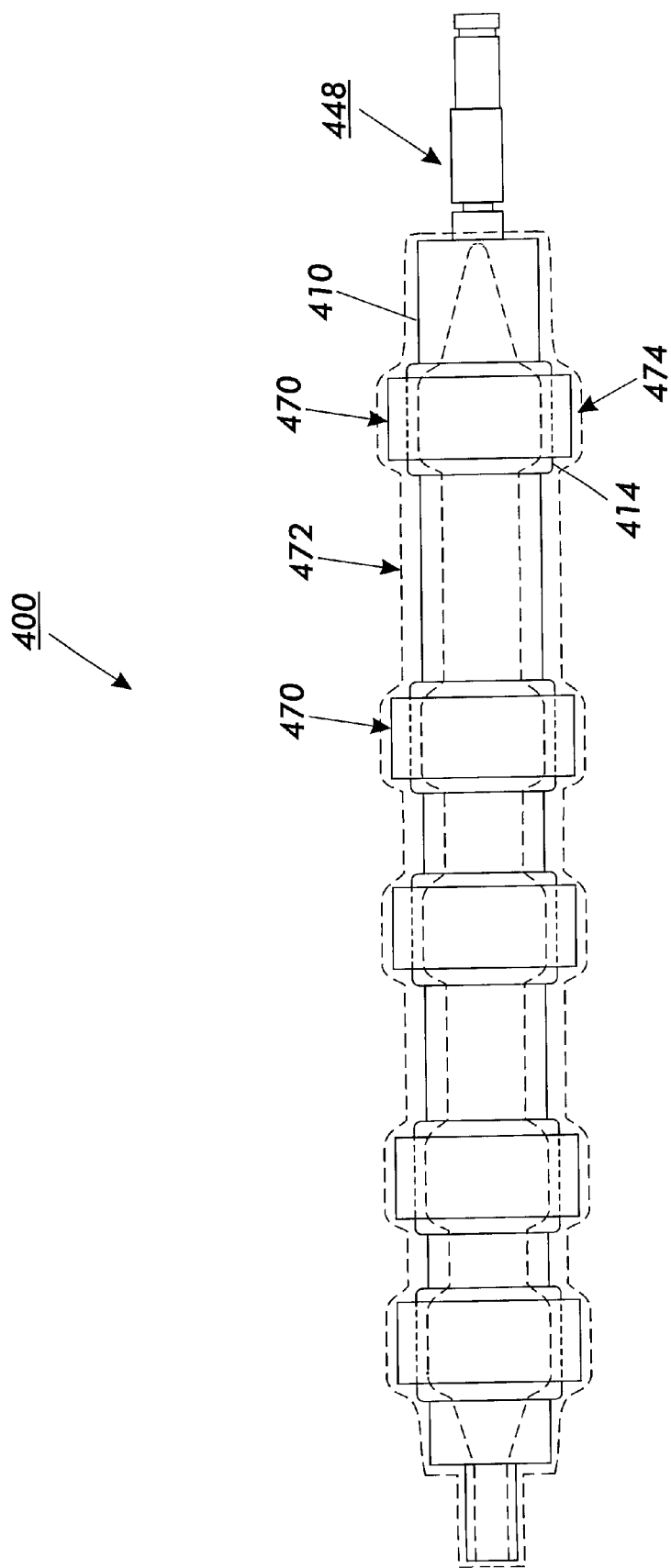
FIG. 11 is an elevational view partially in cross section of the FIG. 10 shaft with a coating applied to the periphery thereof.

Referring now to FIG. 11, an alternate embodiment of the present invention is shown as shaft 400. Shaft 400 includes an elongated member 448 which is similar to elongated member 100 of FIG. 8. In fact, elongated member 448 may be identical to elongated member 100 of FIG. 8. In addition to the elongated member 448, the shaft 400 further includes a component 470 which may be positioned on outside surface 410 of the elongated member 448. Preferably and as shown in FIG. 11 the component 470 is positioned over functional feature portion 414 of the elongated member 448. The component 470 may be any component which may be placed over the shaft 400 and may for example be a rubber or a synthetic rubber component which may be interferencely fitted to the elongated member 448.

While a solitary component 470 may be utilized with the shaft 400 as shown in FIG. 11, a component 470 is positioned at each function feature portion 414. As shown in FIG. 11, the shaft 400 includes an overcoating 472 which is applied to outside surface 410 of the elongated member 448 and as shown in FIG. 11 to outer periphery 474 of the component 470. The overcoating 472 serves to secure the component 470 to the elongated member 448. The overcoating 472 may be utilized to improve the characteristics of the shaft. For example, the overcoating 472 may be a material with increased coefficient of friction to assist in the use of the shaft 470 as a drive roll. For example, the overcoating 472 may be a silicone or a thermoplastic elastomer, TPE, such as urethane.

Figure 12:
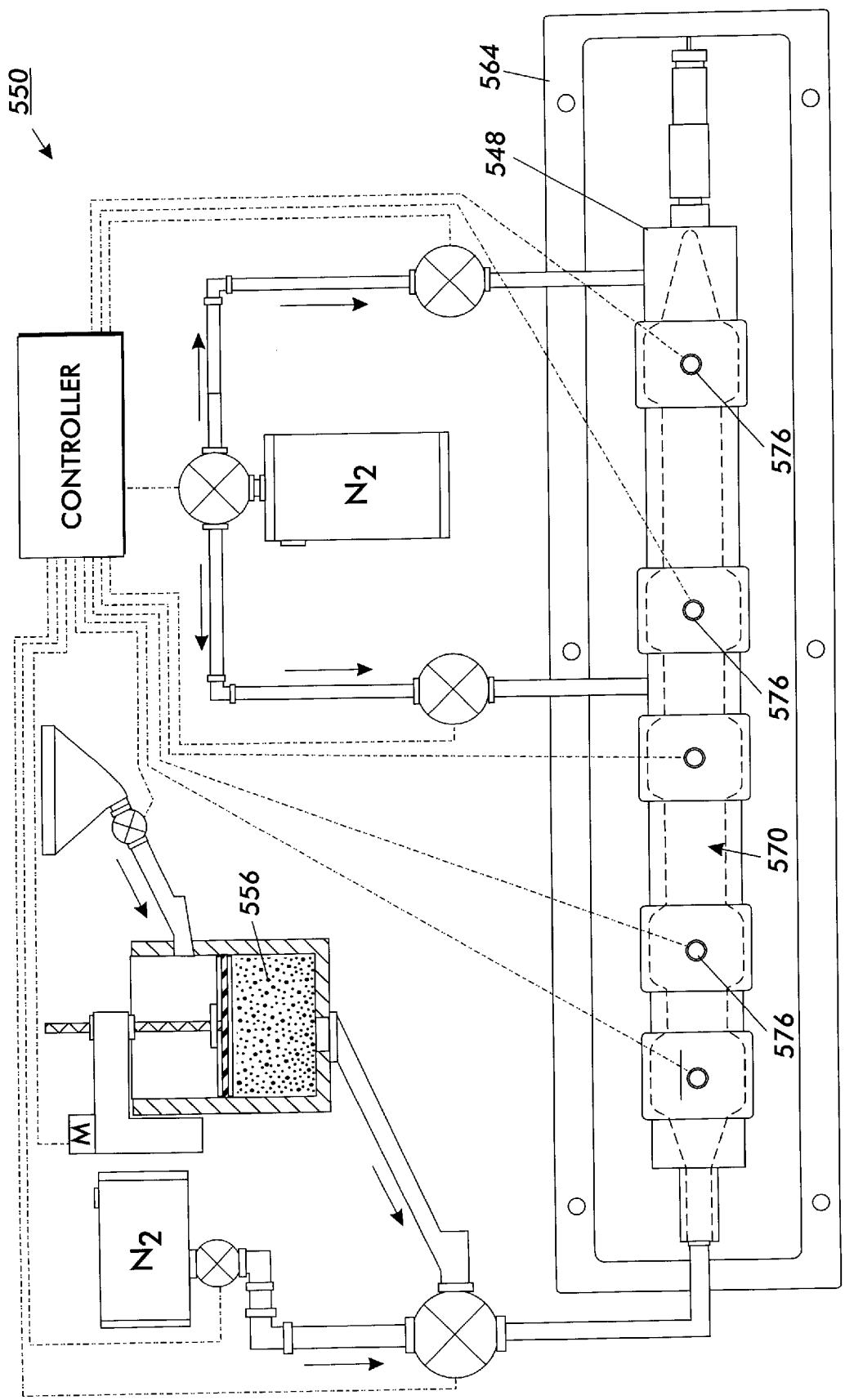
FIG. 12 is a schematic representation partially in cross section of another embodiment of a molding apparatus for use in molding another embodiment of a shaft including integrally molded apertures for the shaft assembly according to the present invention.

Referring now to FIG. 12, a gas assist molding apparatus 550 is shown. The gas assisted molding apparatus 550 is similar to the gas assisted molding apparatus 50 of FIG. 7 except that the mold 564 further includes a series of retractable pins 576. During the molding of the shaft 548, the retractable pins 576 are extended internally into mold cavity 570. Thus, as the moldable material 556 enters into the mold cavity 570, the retractable pins provide an aperture gate for the forming of features upon the functional feature portions of the elongated shaft. After the molding of the shaft 548, the retractable pins 576 are retracted into the mold 564 to permit removal of the shaft 548 from the mold 564.

Figure 13:
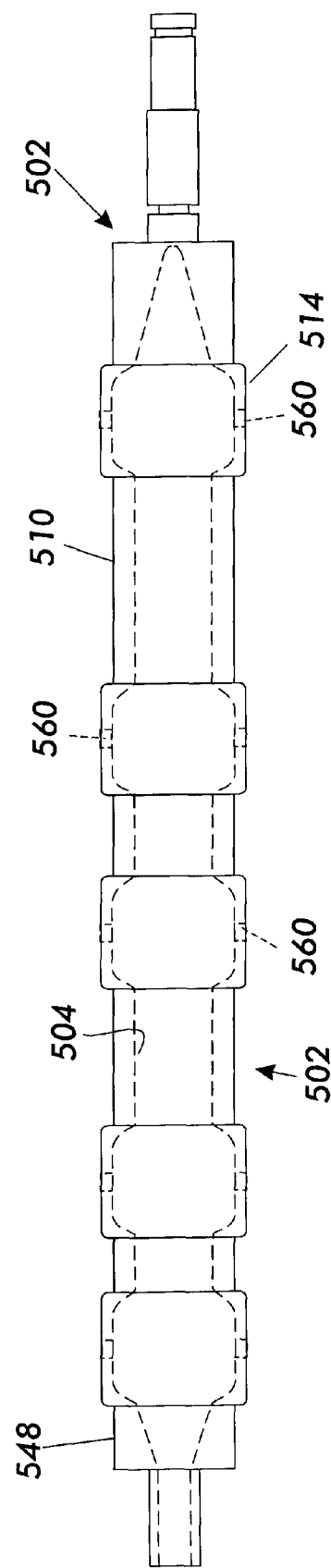
FIG. 13 is an elevational view partially in cross section of another embodiment of a shaft including integrally molded apertures for the shaft assembly according to the present invention which may be molded in the molding apparatus FIG. 12.

Referring now to FIG. 13, the elongated member 548 which has been molded on the gas assisted molding apparatus 550 of FIG. 12 is shown. The elongated member 548 is similar to the elongated member 100 of FIG. 8, except that the elongated member 548 further includes molded aperture gates 560 formed in elongated member 548. The molded aperture gates 560 extend from inside surface 504 of the elongated member 548 to outside surface 510 of the elongated member 548. As shown in FIG. 13, the aperture gates 560 may be positioned on functional feature portions 514 of the elongated member 548. While a solitary aperture gate 560 may be positioned at each functional feature portion 514, preferably, and as shown in FIG. 13, a plurality of aperture gates 560 are positioned at each functional feature position 514 to provide adequate flow capacity for the later molding of the interior of the hollow portion 502 and external features (not shown) on the elongated member 548.

Figure 14:
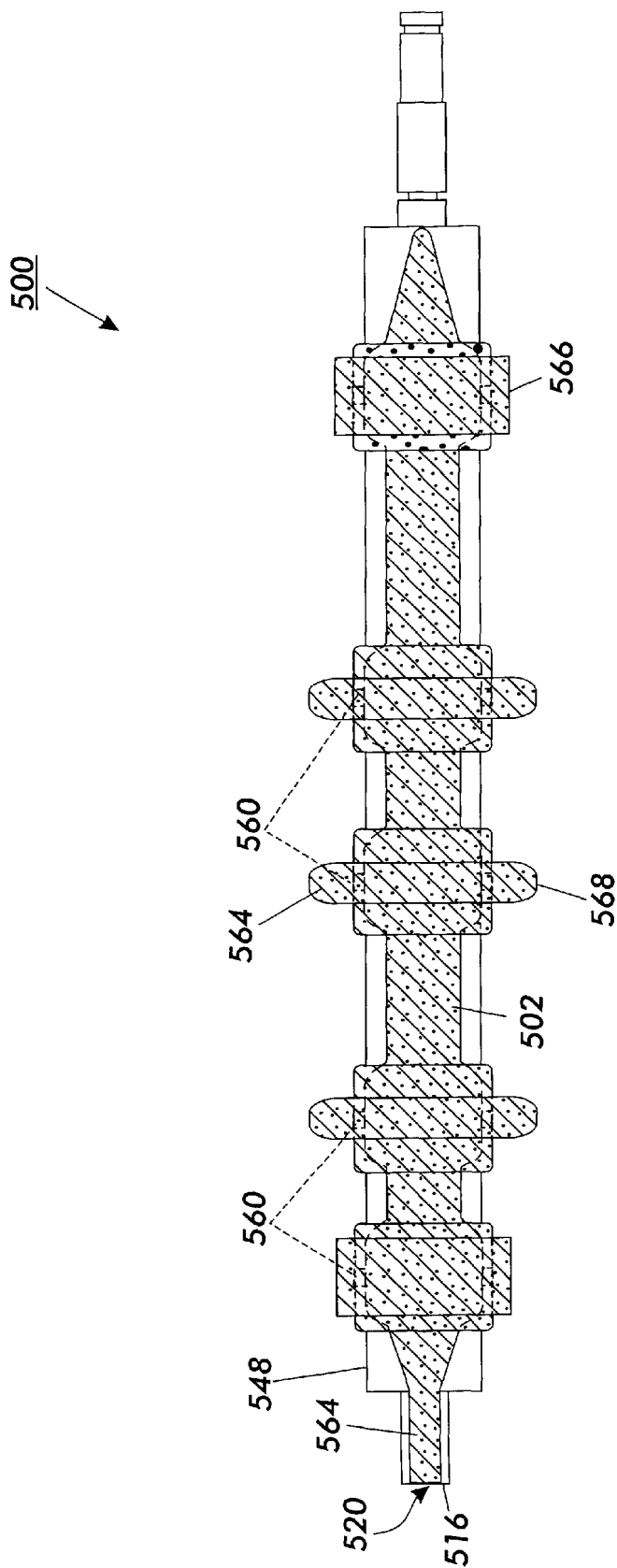
FIG. 14 is an elevational view partially in cross section of another embodiment of a shaft assembly according to the present invention including the shaft of FIG. 13 which is then utilized in the composite molding shaft process of FIG. 3 to form a shaft assembly with molded external features according to the present invention.

Referring now to FIG. 14 an alternate embodiment of the present invention is shown as shaft assembly 500 which utilizes the elongated member 548 of FIG. 13. Moldable material 564 which is similar to molded material 364 of FIG. 10, is inserted through aperture 520 located in first end 516 of the elongated member 548. The moldable material 564 passes from hollow portion 502 through aperture gates 560 into a mold (not shown) which forms first roller type 566 and second roller type 568.

Figure 15:
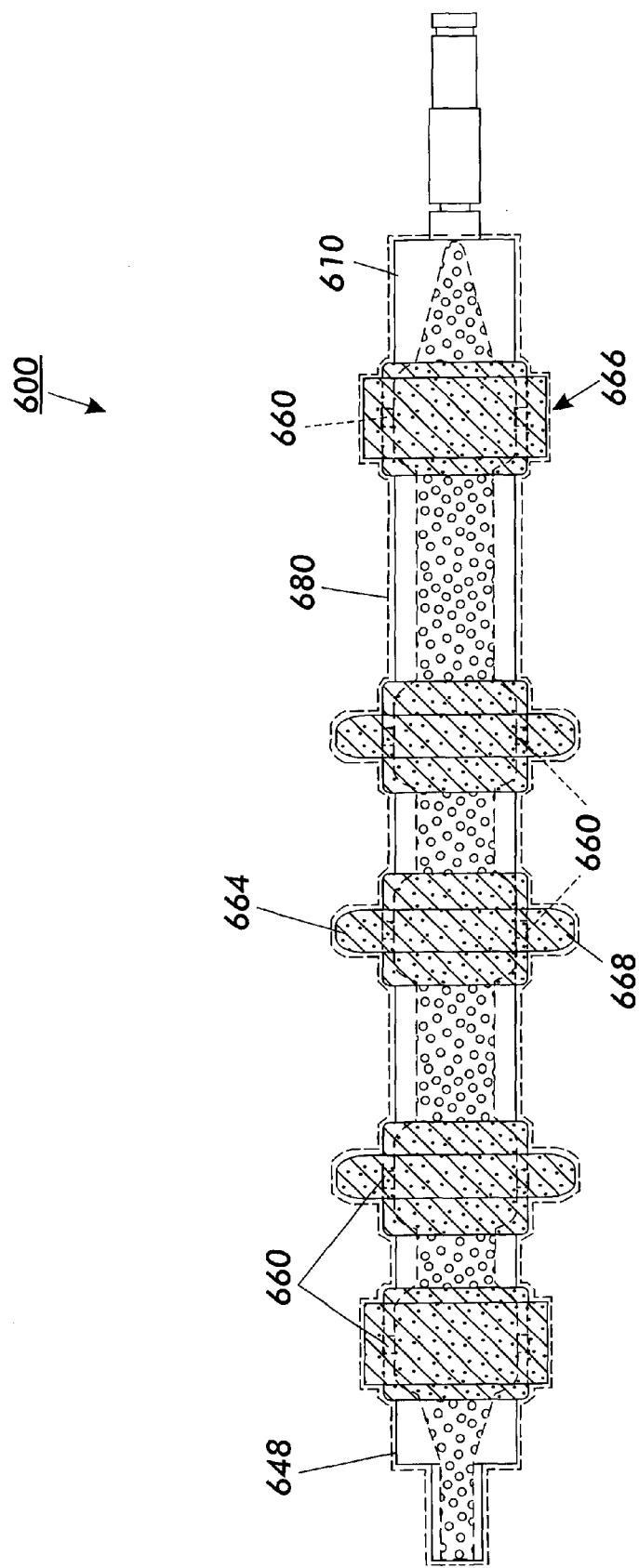
FIG. 15 is an elevational view partially in cross section of the FIG. 14 shaft with a coating applied to the periphery thereof.

Referring now to FIG. 15, an alternate embodiment of the present invention is shown as shaft assembly 600. Shaft assembly 600 includes an elongated member 648 which is similar to elongated member 548 of FIG. 14. Elongated member 648 is filled with moldable material 664 and is used to form first roller type 666 and second roller type 668. The moldable material 664 passes through aperture gate 660 while forming the roller type 666 and 668. The moldable material 664 is similar to moldable material 564 of FIG. 14. The shaft assembly 600 further includes a coating 680 which may be positioned over outside surface 610 of the elongated member 648 as well as over the first roller type 666 and the second roller type 668. The coating 680 may be similar to coating 224 of FIG. 9 and may be applied by the similar processes to apply the coating 224 of FIG. 9. The coating 680 may be utilized to provide for a surface protection or surface coefficient of friction to enhance the operation of the shaft assembly 600.

By providing a hollow injection molded shaft, a less expensive lighter weight shaft may be provided.

By providing a gas injection molded shaft including an internal cavity and large diameters and thin walls, a strong rigid lightweight and inexpensive shaft may be provided.

By providing a hollow molded integral shaft assembly a simple low cost shaft may be provided.

By providing a molded hollow plastic shaft filled with a plastic utilizing a composite shaft technology and thereby providing functional features over the hollow plastic shaft, a simple inexpensive drive roller may be provided with increased coefficient of friction at the drive rolls.

By providing a hollow plastic shaft with a material with a high coefficient of friction applied to the functional features thereof, a simple inexpensive shaft may be provided which has high friction drive rolls.

By providing a hollow plastic shaft with a plastic material corrosion may be avoided.

By providing a gas assisted molded shaft with added shaft diameters and shaft shoulders, the need for E-rings may be eliminated.

By providing gas assisted molding shafts with large diameters, the flow of the resin in the composite shaft molding process can be enhanced and the shaft may be strengthened and stiffened.

Accordingly, a new lightweight, low cost shaft assembly has been provided. In addition, the manufacturing process facilitates the rapid manufacturability and assembly of a shaft assembly having a plurality of functional features. It is a simple process in which the number of parts used in or on a shaft assembly as well the weight of the shaft assembly are dramatically reduced. Reductions in weight without sacrificing strength of up to about 60 percent have been achieved for this manufacturing process and reductions in manufacturing costs have been dramatically reduced to of the order at times of 25 to 30 percent of original manufacturing costs.

The patents specifically referred to herein are hereby incorporated in their entirety by reference.

While the invention has been described with reference to a shaft assembly useful in electrostatographic printing machine, it will be understood to those skilled in the art that it may be used in virtually any machine performing a function which requires the use of a rotatable shaft member. Accordingly, it is intended to embrace all such alternatives and modifications as may fall within the spirit and scope of the appended of claims.

I claim:

1. A shaft assembly comprising:
   a rotatable, torque transmitting elongated member having a length, an inside surface, an outside surface, an inside perimeter on the inside surface and an outside perimeter on the outside surface defining a shaft and a shaft core, said outside surface including a torque transmitting portion and a functional feature portion, said elongated member including an aperture gate extending from the inside surface to the outside surface wherein said functional feature portion includes an outside offset portion extending the entire outside perimeter and for a distance along the length of the member and an inside offset portion extending the entire inside perimeter and for a distance along the length of the member, the inside offset portion and the outside offset portion extending in a direction away from a center of the shaft core; and
   a hardened, moldable material extending from the inside surface through the aperture gate, the material secured to at least a portion of the outside surface.

2. The shaft assembly of claim 1 wherein said elongated member has a one piece construction.

3. The shaft assembly of claim 1 wherein said elongated member comprises a plastic.

4. The shaft assembly of claim 1 wherein said elongated member is made by a gas injection molding process.

5. The shaft assembly of claim 1 wherein said elongated member comprises at least one of SPS, polycarbonate, Acetal and ABS.

6. The shaft assembly of claim 1 further comprising a coating applied to at least a portion of an outer surface of the hardened, moldable material.

7. The shaft assembly of claim 1 wherein said hardened, moldable material comprises a material selected to provide a frictional driving surface.

8. A shaft comprising:
a rotatable, torque transmitting elongated member having an inside surface, an outside surface, an inside perimeter on the inside surface and an outside perimeter on the outside surface defining a shaft and a shaft core, said elongated member including a torque transmitting portion and a functional feature portion, the functional feature portion includes an outside offset portion extending the entire outside perimeter and for a distance along the length of the member and an inside offset portion extending the entire inside perimeter and for a distance along the length of the member, the inside offset portion and the outside offset portion extending in a direction away from a center of the shaft core.

9. The shaft of claim 8 wherein said elongated member has a one piece construction.

10. The shaft of claim 8 wherein said elongated member comprises a plastic.

11. The shaft of claim 8 wherein said elongated member is made by a gas injection molding process.

12. The shaft of claim 8 wherein said elongated member comprises at least one of SPS, polycarbonate, Acetal and ABS.

13. The shaft of claim 8 further comprising a coating applied to at least a portion of an outside surface of the elongated member.

14. The shaft of claim 8 wherein said elongated member further comprises a material selected to provide a frictional driving surface.

15. The shaft of claim 8 wherein the shaft comprises at least one of a plastic, urethane, elastomer, and rubber.

16. The shaft of claim 8 wherein the shaft assembly includes an outside periphery having at least one portion offset radially from at least one other portion.

17. An apparatus comprising mechanical components capable of performing at least one operation requiring the use of a shaft assembly, said shaft assembly comprising:
a rotatable, torque transmitting elongated member defining a portion thereof which is hollow having an inside surface, an outside surface, an inside perimeter on the inside surface and an outside perimeter on the outside surface defining a shaft and a shaft core, said shaft having an outside surface including a torque transmitting portion and a functional feature portion wherein the functional feature portion includes an outside offset portion extending the entire outside perimeter and for a distance along the length of the member and an inside offset portion extending the entire inside perimeter and for a distance along the length of the member, the inside offset portion and the outside offset portion extending in a direction away from a center of the shaft core and wherein a distance from the inside surface to the outside surface at the torque transmitting portion is substantially similar to a distance from the inside surface to the outside surface at the functional feature portion, said elongated member defining an aperture gate extending from the inside surface to the outside surface; and
a hardened, moldable material, said material extending from the inside surface through the aperture gate, the material secured to at least a portion of the outside surface.

18. The apparatus of claim 17 wherein said elongated member has a one piece construction.

19. The apparatus of claim 17 herein said elongated member comprises a plastic.

20. The apparatus of claim 17 wherein said elongated member is made by a gas injection molding process.

21. The apparatus of claim 17 wherein said elongated member comprises at least one of SPS, polycarbonate, Acetal and ABS.

22. The apparatus of claim 17 wherein said hardened, moldable material comprises a material selected to provide a frictional driving surface.

23. The apparatus of claim 17 further comprising a coating applied to at least a portion of an outer surface of the hardened, moldable material.

24. The apparatus of claim 17 wherein the apparatus is an electrostatographic machine.

25. A shaft assembly comprising:
a first structure comprising a moldable material and forming an elongated member having an inside surface, an outside surface, a core, a length, an inside perimeter on the inside surface and an outside perimeter on the outside surface and a wall, the wall having a substantially uniform thickness over at least a portion of the elongated member, the first structure including at least one step in the wall forming at least one offset including an outside offset portion extending the entire outside perimeter and for a distance along the length of the first structure and an inside offset portion extending the entire inside perimeter and for a distance along the length of the first structure, the inside offset portion and the outside offset portion extending in a direction away from the core; and
a second structure comprising a moldable material associated with the first structure, said second structure extending over at least a portion of the outside surface of the first structure.

26. The apparatus of claim 25 further comprising a coating applied to at least a portion of an outer surface of the shaft assembly.

27. The apparatus of claim 25 wherein said second structure comprises a material adapted for a frictional driving surface.

28. The shaft assembly of claim 25 wherein the shaft assembly comprises at least one of a plastic, urethane, elastomer, and rubber.

29. An apparatus comprising:
a shaft including a first structure and a second structure, the first structure comprising a plastic material, the first structure including an inside surface, an inside perimeter, an outside surface, an outside perimeter, and a length, each of the inside surface and the outside surface having at least one step formed therein forming at least one raised portion offset from at least one other lower portion along the length of the shaft, wherein the raised portion includes an outside offset portion extending the entire outside perimeter and for a distance along the length of the member and an inside offset portion extending the entire inside perimeter and for a distance along the length of the member, the inside offset portion and the outside offset portion extending in a direction away from a center of the shaft core, the second structure comprising at least one of urethane, elastomer, and rubber, the second structure disposed on at least a portion of the outside surface of the first structure;
wherein the shaft includes a hollow cavity therein.

30. A shaft comprising:
an elongated member having an inside surface, an outside surface, a length, and a wall, the wall having a substantially uniform thickness over at least a portion of the elongated member, said inside surface and said outside surface including at least one step forming an offset extending a complete circumference and a distance along the length on both the inside surface and the outside surface from at least one other portion of the elongated member, the elongated member including a molded material including at least one of plastic, urethane, elastomer, and rubber;

wherein the shaft includes a hollow cavity in at least a portion of the interior of the shaft.

31. The shaft assembly of claim 1 wherein the elongated member has a length thereof at least ten times greater an outer diameter of said elongated member.

* * * * *